May 16, 1933.　　　F. CHARAVAY　　　1,909,611
MOTOR SUPPORT
Filed Oct. 1, 1928

INVENTOR,
Frederick Charavay,
BY
ATTORNEY

Patented May 16, 1933

1,909,611

UNITED STATES PATENT OFFICE

FREDERICK CHARAVAY, OF PIQUA, OHIO, ASSIGNOR, BY MESNE ASSIGNMENTS, OF ONE-HALF TO HARTZELL INDUSTRIES, INC., OF WILMINGTON, DELAWARE, A CORPORATION OF DELAWARE

MOTOR SUPPORT

Application filed October 1, 1928. Serial No. 309,668.

This invention relates to new and useful improvements in motor supports.

It is one of the principal objects of my invention to support a motor by the belts which it drives, thereby to reduce the expense of its installation and the noise of its operation.

An electric motor which drives a blower or a ventilator in a public building such as a schoolhouse or theatre, often transmits to its foundation or hanger a magnetic hum or sound which is offensive to the ear. But when such a motor hangs from the flexible belts which it drives, this hum or sound is not present, for the vibration of the motor, which is the cause of this offensive feature, is absorbed by the supporting drive belts.

In using this motor support a tightener for the drive belts is not necessary, since the weight of the motor supported by them is sufficient to give them the tension which they require.

Since the motor unit depends entirely upon the drive belts for support, a compactness is acquired that cannot be had when the motor unit is otherwise supported. This feature renders the unit better adapted for shipment. It also allows the use of a smaller size, cheaper and more efficient motor for blower and ventilator units.

Other important and incidental objects will be brought out in the following specification and particularly set forth in the subjoined claims.

Figure 1:
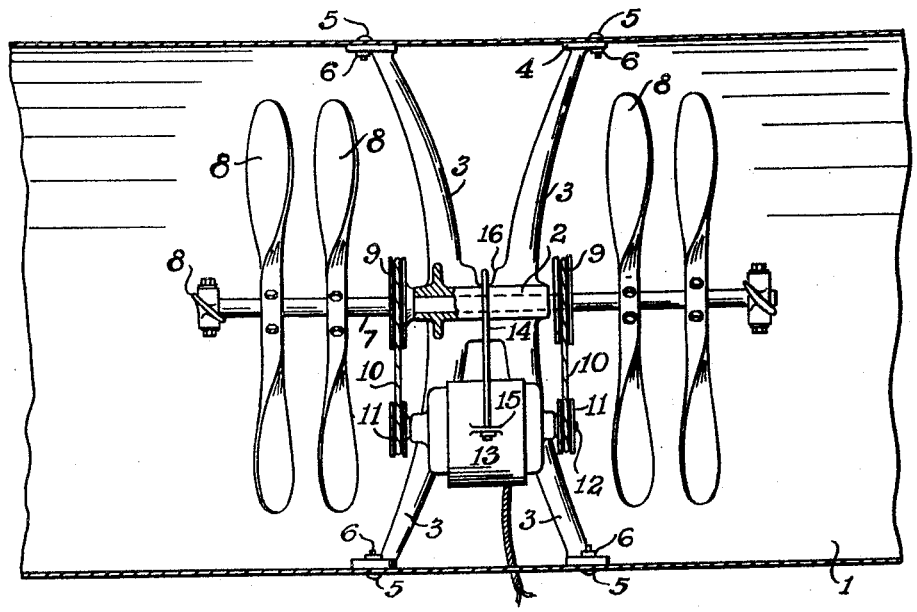
Figure 3:
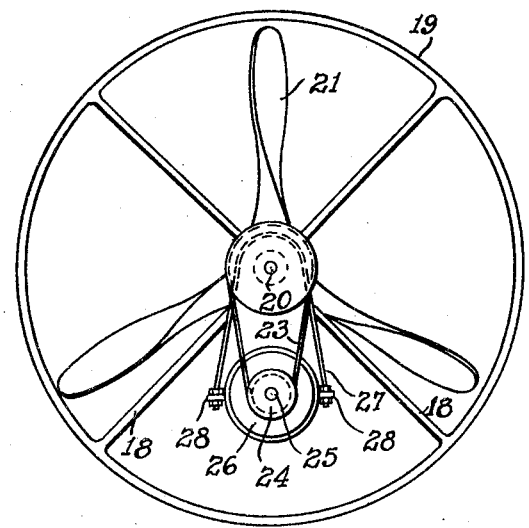
Figure 2:
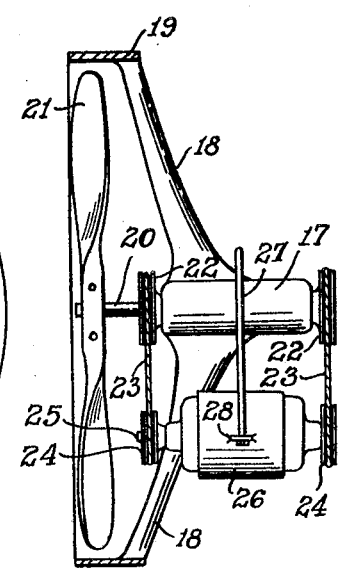

In the accompanying drawing illustrating my invention, Figure 1 is a longitudinal, sectional view taken through an air moving tube, showing the electric operating motor supported by the belts which drive the propeller shaft. Figure 2 is a side view of a small ventilating unit in which the motor is also supported by the driving belts. And Figure 3 is a front view of said unit.

Referring to the accompanying drawing for a detailed description of my invention, the numeral 1 designates a metal tube or shell through which air is to be moved. A bearing 2 is held rigidly in position in the central portion of the tube 1 in the following manner. Radial brace arms 3 are formed on the bearing 2 and have feet 4 on their outer ends. These feet are firmly secured to the inner periphery of the tube 1 by means of bolts 5 and nuts 6. (See Figure 1.)

The bearing 2 carries a shaft 7 which projects from each end of it to receive a series of blades 8, preferably of aerofoil action. These blades can be staggered, as shown in the drawing, but are disposed one behind the other so that each adds its power to that of the others.

Secured to the shaft 7, one adjacent each end of the bearing 2, are pulleys 9, 9. Each pulley receives a belt 10 constructed of a flexible material such as rubber, which passes over a pulley 11 mounted on one end of an armature shaft 12 of an electric motor 13. There is no other support for the motor 13 than the belts 10, 10. This results in the vibration and magnetic hum of the motor being absorbed by the belts, so that no disturbing sounds or rackets will be transmitted to the environment of the motor. Such a motor support also obviates silencing foundations and the necessity for the employment of belt tighteners.

To prevent the motor 13 from turning or twisting in operation, a torque rod 14 is provided. This rod is bent to form a U end which straddles the bearing 2 and is connected at its lower ends to ears 15 on the sides of the motor. Although not necessary, there is provided a groove 16 which receives the upper U end of the torque rod 14. (See Figure 1.)

The torque rod not only serves as a stabilizing agent for the motor 13, but as a means of preventing its fall if one or both of the belts 10, 10 should break. However, the rod does not aid in supporting the motor, since this is entirely committed to the belt slings.

In Figures 2 and 3, I have illustrated a small ventilating unit in which the motor is also supported by the belts which it drives. Referring to these figures for a detailed description, the numeral 17 designates a bearing supported by radial arms 18 of a ring support 19. The bearing 17 carries a shaft 20 which projects from each end thereof. On the outer end of the shaft 20 there is secured a blade 21, preferably of aerofoil action.

Also mounted on the shaft 20, one adjacent each end of the bearing 17, are pulleys 22, 22. Around the latter pass flexible belts 23, 23 which also pass over pulleys 24, 24, directly below the pulleys 22, 22 on an armature shaft 25 of an electric motor 26. As will be observed, this motor, like the motor 13, is wholly supported by its driving belts 23, 23, to obviate the disturbing sounds which it would otherwise transmit to a foundation or rigid bracket. Such a flexible support also permits a smaller sized motor to be used and one which may be compactly shipped and easily installed.

A torque rod 27 is provided to prevent the motor 26 from turning or twisting in operation. This is bent to form a U end which straddles the bearing 17, and is connected at its lower ends to ears 28 on the sides of the motor.

A motor supported by the belts which it drives, admirably lends itself for use in any environment where it is desired to eliminate disturbing sounds such as its magnetic hum and to reduce the expense of its shipment, installation and operation.

Having described my invention, I claim:

1. In combination, a bearing support, a shaft carried by the latter, belt slings depending from said shaft, a motor whose weight is supported by said belt slings to drive them, and through them, the shaft, and torque means projecting from said motor over said bearing support for the purpose specified.

2. In combination, a bearing support, a shaft carried by the latter, flexible bands depending from said shaft for driving it, a motor whose weight is supported by said bands to drive them, and through them, the shaft, and a torque rod attached to said motor and extending over said bearing support for the purpose specified.

3. In combination, a bearing, a support for said bearing, a shaft carried by the latter, pulleys on said shaft, one on each side of said bearing, belt slings depending from said pulleys for driving the latter, a motor whose weight is supported by said belt slings to drive them, and through them, the shaft, and a torque rod attached to said motor and extending over the bearing support for the purpose specified.

4. In combination, a bearing, a support for said bearing, a shaft carried by the latter, pulleys on said shaft, one on each side of said bearing, belt slings depending from said pulleys for driving the latter, a motor, pulleys on the driving shaft of said motor, one on each end of said shaft, for receiving said belt slings to support said motor which drives them, and a torque rod attached to said motor and extending over the bearing support for the purpose specified.

In testimony whereof I have hereunto set my hand this 28th day of September, 1928.

FREDERICK CHARAVAY.